US006813358B1

(12) United States Patent
Di Crescenzo et al.

(10) Patent No.: US 6,813,358 B1
(45) Date of Patent: Nov. 2, 2004

(54) METHOD AND SYSTEM FOR TIMED-RELEASE CRYPTOSYSTEMS

(75) Inventors: Giovanni Di Crescenzo, Morris County, NJ (US); Rafail Ostrovsky, Bergen County, NJ (US); Sivaramakris Rajagopalan, Morris County, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/441,740

(22) Filed: Nov. 17, 1999

Related U.S. Application Data

(60) Provisional application No. 60/108,717, filed on Nov. 17, 1998.

(51) Int. Cl.[7] .................................................. H04L 9/00
(52) U.S. Cl. ....................... 380/280; 380/277; 380/285; 713/178
(58) Field of Search .............................. 380/277, 278, 380/44, 258, 279, 282, 285, 280; 713/153, 178

(56) References Cited

U.S. PATENT DOCUMENTS

| | | | | | |
|---|---|---|---|---|---|
| 5,109,152 A | * | 4/1992 | Takagi et al. | ................ | 235/380 |
| 5,243,652 A | * | 9/1993 | Teare et al. | ................ | 380/250 |
| 5,848,161 A | * | 12/1998 | Luneau et al. | ................ | 705/78 |
| 6,424,718 B1 | * | 7/2002 | Holloway | ................ | 380/277 |
| 6,430,292 B1 | * | 8/2002 | Ito et al. | ................ | 380/280 |
| 6,603,857 B1 | * | 8/2003 | Batten-Carew et al. | ....... | 380/44 |

OTHER PUBLICATIONS

Ralph C. Merkle, "Secure Communications Over Insecure Channels" Communications of the ACM, vol. 21, No. 4, Apr. 1978, pp. 294–299.

Ronald L. Rivest, et al., "Time–Lock Puzzels and Time–Released Crypto", (http://theory.ICS.mit.edu/rivest/publications.html), pp. 1–9.

Ronald Cramer, et al., "A Practical Public Key Cryptosystem Provably Secure Against Adaptive Chosen Ciphertext Attack", in the proceedings of Advances in Cryptology—CRYPTO 98, Lecture Notes in Computer Science, Springer Verlag, pp. 13–25.

* cited by examiner

*Primary Examiner*—Andrew Caldwell
*Assistant Examiner*—Minh Dieu T Nguyen
(74) *Attorney, Agent, or Firm*—Joseph Giordano

(57) ABSTRACT

A method and system are provided for timed-release cryptography. A sender encrypts data in a timed-release fashion such that a receiver based on information exchanged with a server decrypts the encrypted data at or after a release time without revealing to the server any information about the sender, the data, and the release time. In one embodiment, the sender encrypts a key and a release time based on a public key of the receiver and encrypts the data based on the encrypted key. The server determines a condition, which is a function of the encrypted key, the encrypted release time, and a current time. The server then sends the condition to the receiver using a conditional oblivious transfer method. If the current time as determined by the server is greater than or equal to the release time, the receiver determines the encrypted key based on the condition. The receiver then uses the encrypted key to decrypt the encrypted data. However, if the current time is less than the release time, the receiver fails to determine the encrypted key based on the condition, and thus, fails to decrypt the encrypted data.

19 Claims, 14 Drawing Sheets

METHOD AND SYSTEM FOR TIMED-
RELEASE CRYPTOSYSTEMS

CROSS-REFERENCE TO RELATED
APPLICATIONS

This application claims the benefit of U.S. Provisional Application No. 60/108,717, filed Nov. 17, 1998, the contents of which are hereby incorporated by reference.

BACKGROUND OF THE INVENTION

The present invention relates generally to cryptography, and more particularly, to a method and system for timed-release public key encryption of data.

Timed-release cryptography is a method for encrypting data such that the encrypted data cannot be decrypted by the intended recipients until a desired release time in the future. Timed-release cryptography can be used in many applications including, e-commerce, sealed bids, press releases, pay-per-view videos, etc. In such applications, a sender typically sends encrypted data, for example a document, to a receiver without allowing the receiver to decrypt the encrypted data until a desired release time.

One known method for timed-release cryptography is "time-lock puzzle," which is described in R. C. Merkle, "Secure Communications Over Insecure Channels," Communications of the ACM, volume 21, pp. 291–299, April 1978, and in R. Rivest et al., "Time-Lock Puzzles and Timed-Release Crypto," http://theory.lcs.mit.edu/~rivest/publications.html. Using the time-lock puzzle method described in Merkle and Rivest et al., a sender desiring to send data to a receiver encrypts the data such that the average minimum computational time required for any computer to decrypt the encrypted data equals a desired release time. The sender then sends the encrypted data to one or more receivers. At the release time, the sender then sends to the receivers a key for decrypting the encrypted data.

One disadvantage of this method is that a receiver might have the computational capacity to decrypt the encrypted data before the average minimum computational time. A second disadvantage is that since each receiver in a system might have different computational capacities an encrypted data may not be decrypted by all receivers at the same time. For example, a receiver with a particular processing capacity might decrypt the encrypted data before a receiver that has a lesser processing capacity.

Another known method for timed-release cryptography is a "time-server method." Using this method, a sender desiring to send data to a receiver sends the data to a time server, which functions as an escrow agent for storing the data until the desired release time. At the release time, the time server then releases the data to the receiver. This method is not scalable for large systems, however, because the time server must store data received from all senders in the system. Also, this method does not guarantee a private communication between the sender and the receiver since the identity of the sender, the receiver, the data, and the release time must be revealed to the time server.

Rivest et al. describes an improved time-server method, where a time server uses the iterates of a one-way function (or a public key sequence) and publishes the next iterate value after a period of time. Using this method, a sender desiring to send timed-release data to one or more receivers sends the data to a time server, where the time server encrypts the data (or a key to an encryption of the data) with a private key and sends the encrypted data to the receivers. The time server then publishes the private key at the release time so that the receivers can decrypt the encrypted data.

This method suffers from at least two disadvantages: first, it is not scalable for large systems or systems with long runtimes since the time server has to generate and publish a large number of keys. Second, this method does not guarantee a private communication between the sender and the receivers since the identity of the sender and the desired release time must be revealed to the time server.

DESCRIPTION OF THE INVENTION

Thus, it is desired to provide a method and system for timed-release cryptography, which overcome the above and other disadvantages of the prior art.

Accordingly, methods and systems consistent with the present invention encrypt data in a timed-release fashion such that a receiver based on information exchanged with a server decrypts the encrypted data only at or after a release time without revealing to the server any information about the data, the sender that encrypted the data, and the release time. Furthermore, such methods and systems decrypt the encrypted data without establishing communication between the sender and the server. Moreover, such methods and systems significantly reduce the amount of communication between the sender and the receiver and between the server and the receiver.

In one embodiment, a system comprises a sender, a receiver, and a server. When the sender desires to send encrypted data in a timed-release fashion to the receiver, the sender encrypts the data such that the receiver, based on information exchanged with the server, decrypts the encrypted data only at or after a release time without revealing to the server any information about the sender and the data.

When the sender desires to send encrypted data in a timed-release fashion to the receiver, the sender encrypts a key and a release time based on the public key of the server. The sender encrypts the data based on the encrypted key, and sends to the receiver the encrypted key, the encrypted release time, and the encrypted data. When the receiver desires to decrypt the encrypted data, the receiver sends the encrypted key and the encrypted release time to the server.

The server decrypts the encrypted key and the encrypted release time using its private key. If the server determines that the current time is less than the release time, the server does not send the decrypted key to the receiver, and thus, the receiver fails to decrypt the encrypted data. However, if the server determines that the current time is greater than or equal to the decrypted release time, the server sends the decrypted key to the receiver. The receiver then uses the decrypted key to decrypt the encrypted data. Accordingly, the receiver successfully decrypts the encrypted data at or after the release time without revealing to the server any information about the sender and the data.

In another embodiment, when a sender desires to send encrypted data in a timed-release fashion to a receiver, the sender encrypts the data such that the receiver, based on information exchanged with a server, decrypts the encrypted data only at or after a release time without revealing to the server any information about the sender, the data, and the release time.

The sender encrypts a key and the release time based on the public key of the receiver. The sender then encrypts the data based on the encrypted key. The sender encrypts a concatenation of the encrypted key and the encrypted release time based on the public key of the server, and sends to the receiver the encrypted concatenation, the encrypted data, and the encrypted release time.

When the receiver desires to decrypt the encrypted data, the receiver sends the encrypted concatenation and the encrypted release time to the server. Using its private key, the server decrypts the encrypted concatenation to determine the encrypted key and the encrypted release time. The server encrypts the current time and determines a condition as a function of the encrypted key, the encrypted current time, the encrypted release time. Using a conditional oblivious transfer method, the server then sends the condition to the receiver.

If the current time is less than or equal to the release time, the receiver fails to determine the encrypted key based on the condition received from the server, and thus, fails to decrypt the encrypted data. However, if the current time is greater than or equal to the release time, the receiver determines the encrypted key based on the condition and uses the encrypted key to decrypt the encrypted data. Accordingly, the receiver decrypts the encrypted data without revealing to the server any information about the sender, the data, and the release time.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
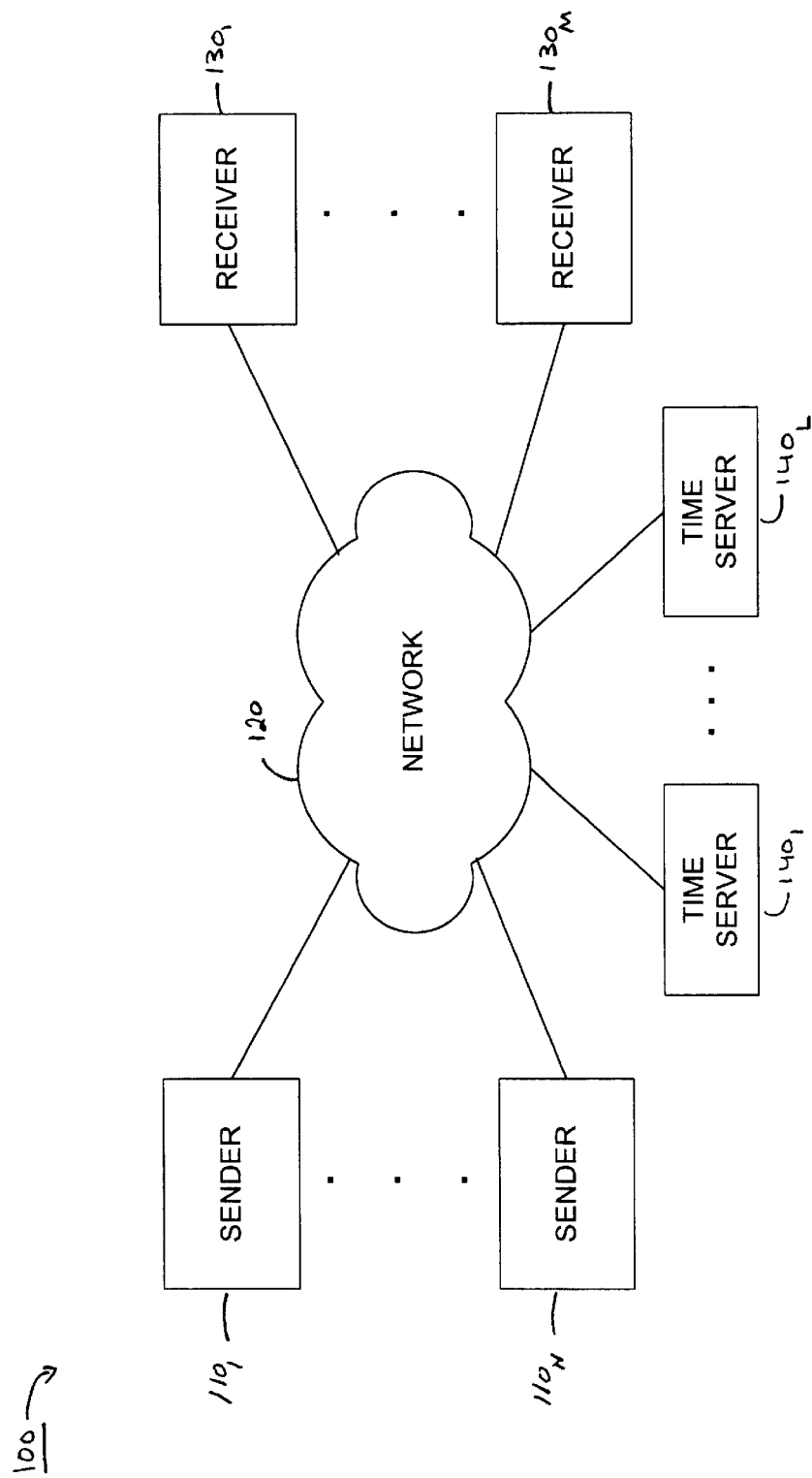
FIG. 1 is a block diagram of a system comprising senders, receivers, and time servers, in accordance with an embodiment of the invention.

FIG. 1 is a block diagram of a system 100, in accordance with an embodiment of the invention. System 100 comprises senders $110_1$-$110_N$, which send via network 120 timed-release data to receivers $130_1$-$130_M$. As will be described below in detail, receivers $130_1$-$130_M$ exchange information with one or more of time servers $140_1$-$140_L$ such that receivers $130_1$-$130_M$ decrypt the timed-release data, without revealing to time servers $140_1$-$140_L$ any information about, for example, the data, the identity of senders $110_1$-$110_N$, the release time of the data, and whether receivers $130_1$-$130_M$ successfully decrypt the timed-release data.

Senders $110_1$-$100_N$, receivers $130_1$-$130_M$, and time servers $140_1$-$140_L$ may include any computer and/or processing device that implements the methods and systems described herein. For example, senders $110_1$-$110_N$ and receivers $130_1$-$130_M$ may include desktop computers, portable computers, Java™ devices, hand-held communication devices, and/or smart cards. Time servers $140_1$-$140_L$ may include, for example, web sites, which provide reliable time information to receivers $130_1$-$130_M$.

Figure 2:
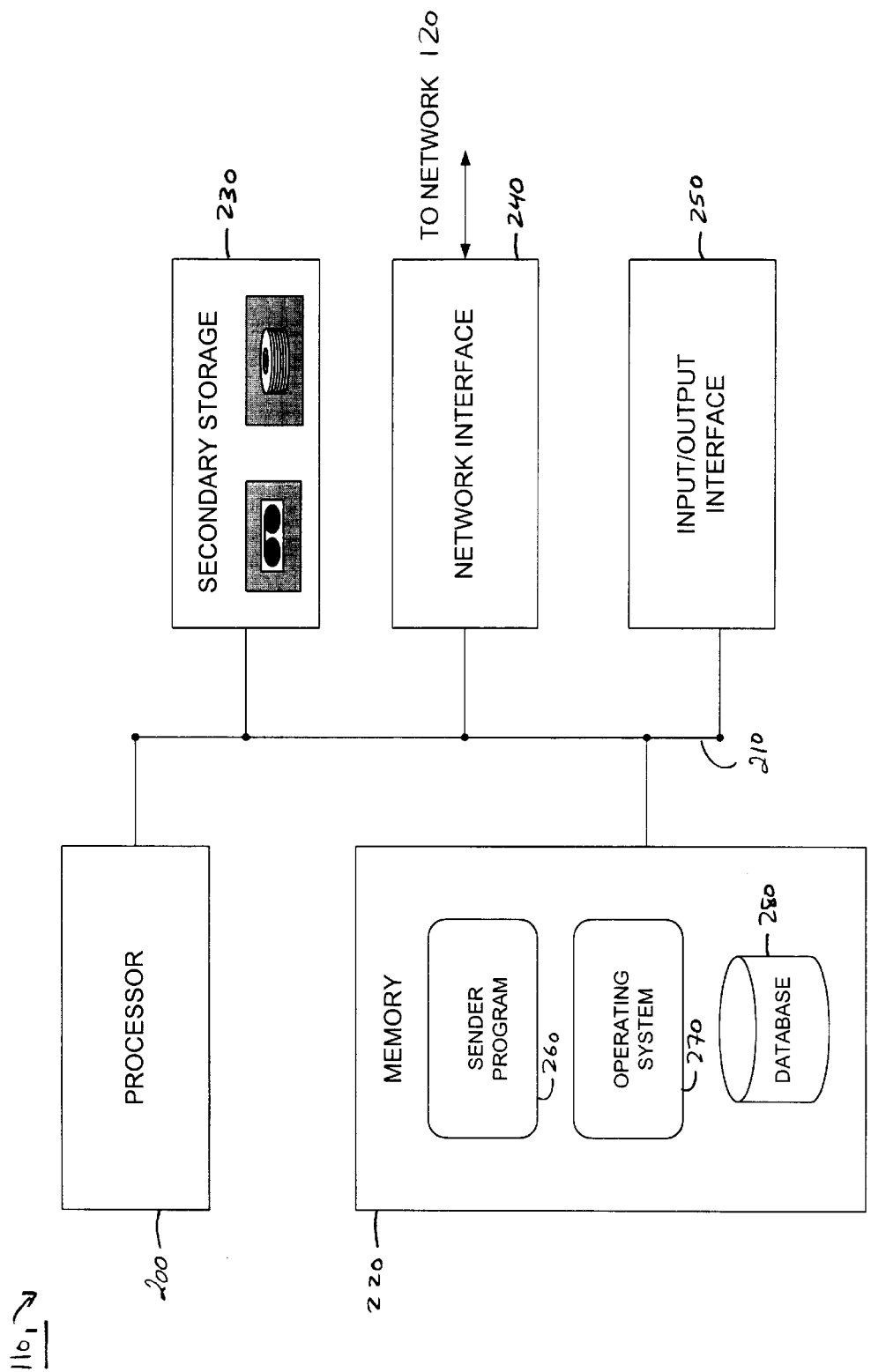
FIG. 2 is a block diagram of a sender, in accordance with an embodiment of the invention.

FIG. 2 is a block diagram of a sender, for example sender $110_1$, in accordance with an embodiment of the invention. Sender $110_1$ includes a processor 200, which connects via bus 210 to a memory 220, a secondary storage 230, a network interface module 240, and an input/output module 250.

Memory 220 includes a sender program 260, an operating system 270, and a database 280. Sender program 260 includes software, which processor 220 executes for sending data stored in database 280 to one or more of receivers $130_1$-$130_M$ in a timed-release fashion such that receivers $130_1$-$130_M$ decrypt the data only when the current time is greater than or equal to the release time of the data. The data may include any information in analog or digital format, for example, text and multimedia information, including voice, audio, video, and graphics.

Secondary storage 230 comprises a computer readable medium such as a disk drive and a tape drive. From the tape drive, software and data may be loaded onto the disk drive, which can then be copied into memory 220. Similarly, software and data in memory 220 may be copied onto the disk drive, which can then be loaded onto the tape drive.

Network interface module 240 includes hardware and software for sending and receiving data via network 120, which may include, for example, an IP network.

Input/Output module 250 may include, for example, a key board or a key pad and a display unit.

Figure 3:
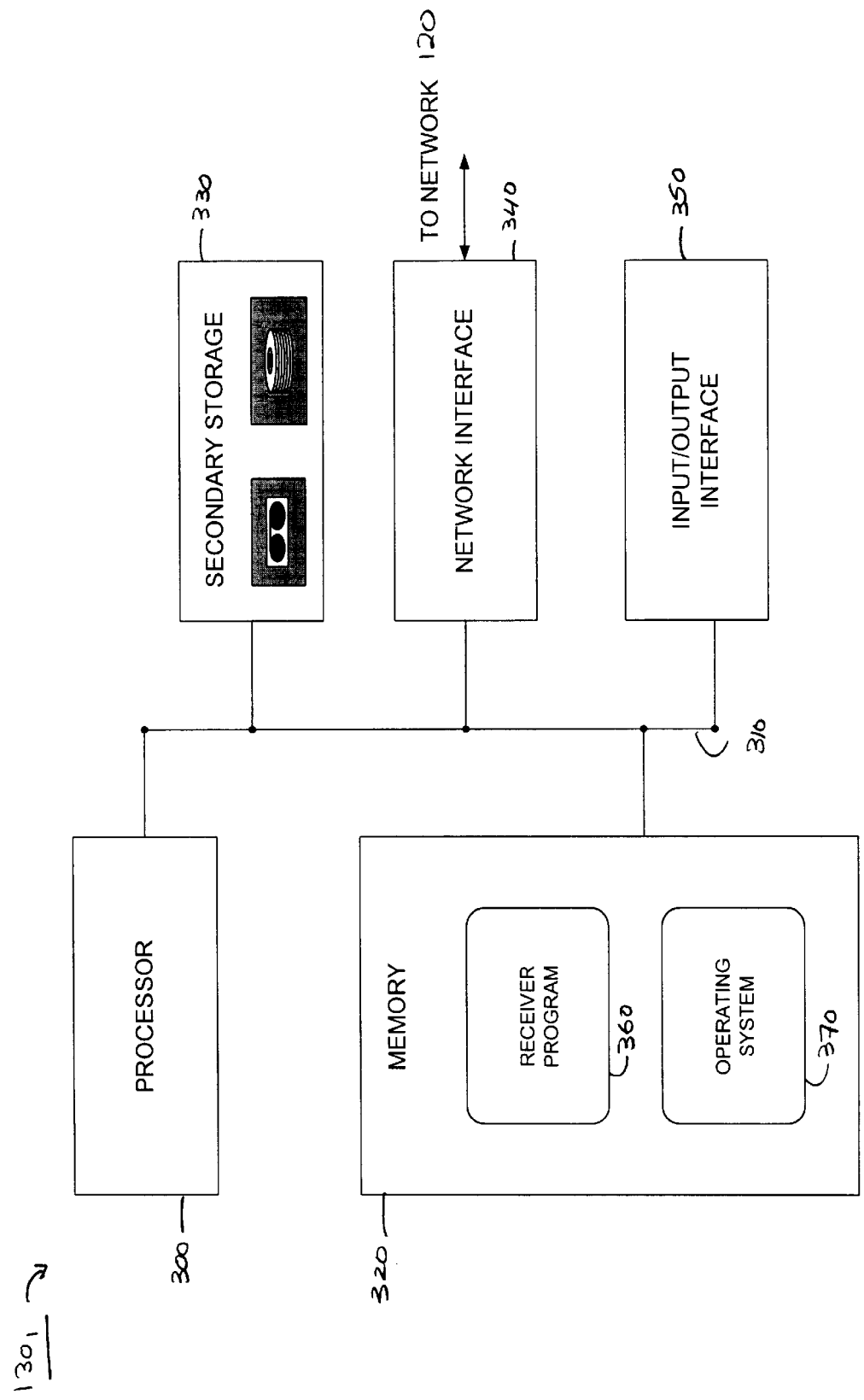
FIG. 3 is a block diagram of a receiver, in accordance with an embodiment of the invention.

FIG. 3 is a block diagram of a receiver, for example receiver $130_1$, in accordance with an embodiment of the invention. Receiver $130_1$ includes a processor 300, which connects via bus 310 to a memory 320, a secondary storage 330, a network interface module 340, and an input/output module 350.

Memory 320 includes a receiver program 360 and an operating system 370. Receiver program 360 includes software, which processor 320 executes for decrypting timed-release data received from one or more of senders $110_1$-$110_N$ such that receiver program 360 decrypts the timed-release data only when the current time is greater than or equal to the release time of the data, without revealing to time servers $140_1$-$140_L$ any information about the data, the identity of senders $110_1$-$110_N$, the release time of the data, and whether receiver program 360 successfully decrypts the timed-release data.

Secondary storage 330 comprises a computer readable medium such as a disk drive and a tape drive. From the tape drive, software and data may be loaded onto the disk drive, which can then be copied into memory 320. Similarly, software and data in memory 320 may be copied onto the disk drive, which can then be loaded onto the tape drive.

Network interface module 340 includes hardware and software for sending and receiving data via network 120.

Input/Output module 350 may include, for example, a key board or a key pad and a display unit.

Figure 4:
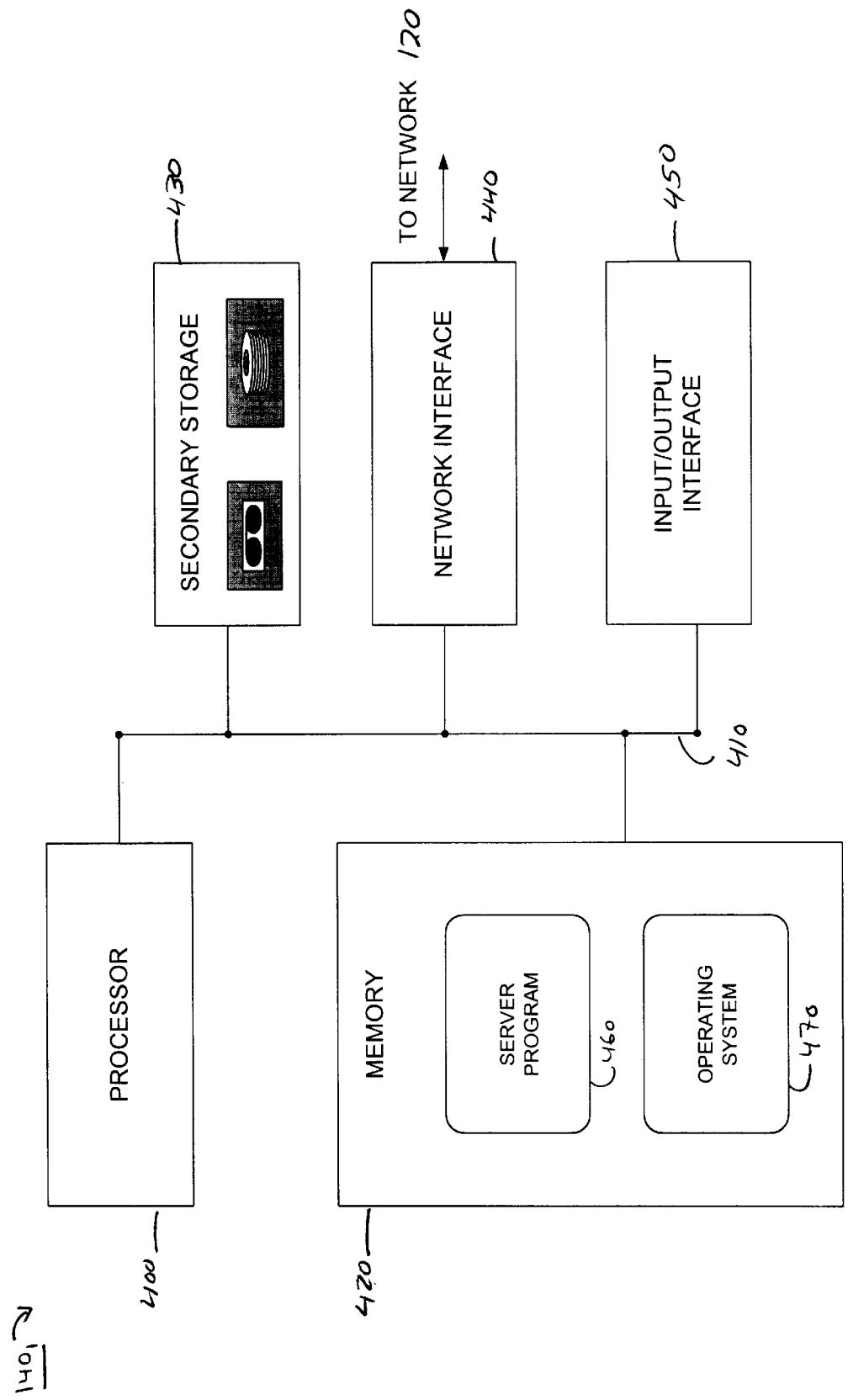
FIG. 4 is a block diagram of a time server, in accordance with an embodiment of the invention.

FIG. 4 is a block diagram of a time server, for example time server $140_1$, in accordance with an embodiment of the invention. Time server $140_1$ includes a processor 400, which connects via bus 410 to a memory 420, a secondary storage 430, a network interface module 440, and an input/output module 450.

Memory 420 includes a server program 460 and an operating system 470. Server program 460 includes software, which processor 420 executes for receiving from and sending information to one or more receivers $130_1$-$130_M$ such that receivers $130_1$-$130_M$ decrypt the timed-release data received from one or more senders $110_1$-$110_N$ only when the current time is greater than or equal to the release time of the data, without revealing to server program 460 any information about the data, the identity of senders $110_1$-$110_N$, the release time of the data, and whether receivers $130_1$-$130_M$ successfully decrypt the timed-release data.

Secondary storage 430 comprises a computer readable medium such as a disk drive and a tape drive. From the tape drive, software and data may be loaded onto the disk drive, which can then be copied into memory 420. Similarly, software and data in memory 420 may be copied onto the disk drive, which can then be loaded onto the tape drive.

Network interface module 440 includes hardware and software for sending and receiving data via network 120.

Input/Output module 450 may include, for example, a key board or a key pad and a display unit.

In one embodiment, sender $110_1$ desires to send timed-release data to receiver $130_1$ such that receiver $130_1$ can decrypt the timed-release data only when the current time t is greater than or equal to a release time d desired by sender $110_1$. In this embodiment, receiver $130_1$ decrypts the timed-release data without revealing to server $140_1$ any information about the data and sender $110_1$. Furthermore, release time d and current time t each include k bits, i.e., bits $d_1$ through $d_k$ and $t_1$ through $t_k$, respectively, where k is a sufficiently large integer.

Figure 5:
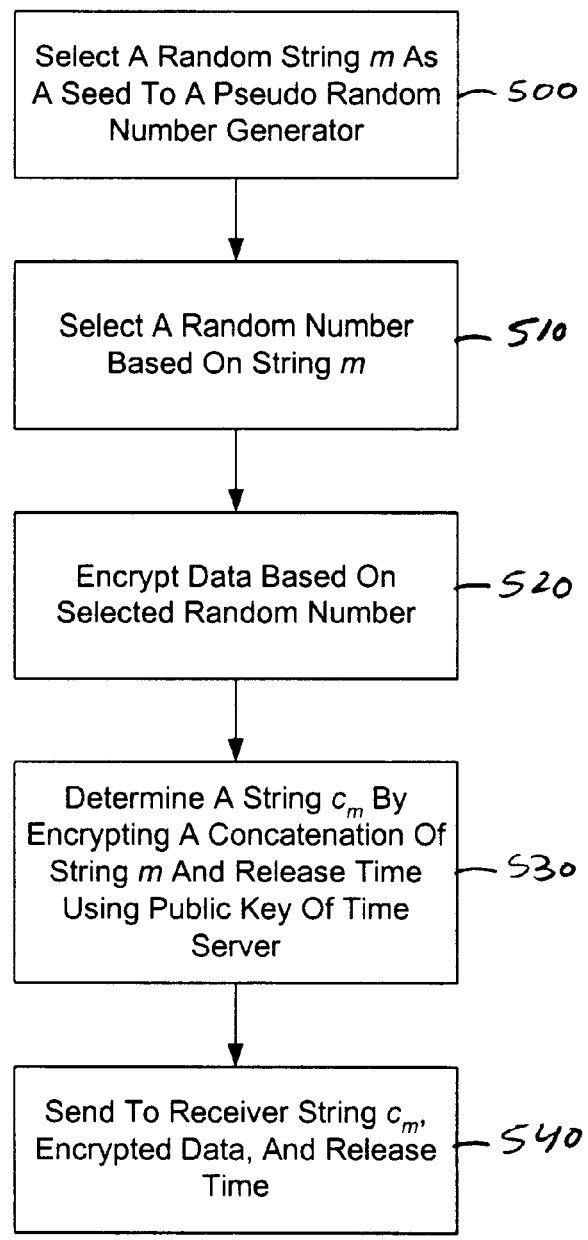
FIG. 5 is a flow chart of the steps performed by a sender for sending timed-release data to a receiver, in accordance with an embodiment of the invention, where information about the sender and the data are not revealed to a time server.

FIG. 5 is a flow chart of the steps performed by sender program 260 in sender $110_1$ for sending timed-release data to receiver $130_1$, in accordance with an embodiment of the invention, where information about sender $110_1$ and the data are not revealed to time server $140_1$. Sender program 260 determines a key by randomly selecting a string m, which may include a plurality of bits (step 500). Sender program 260 uses the string m as a seed to the pseudo random number generator to generate a random number (step 510). Sender program 260 encrypts the data based on the generated random number by, for example, performing an exclusive OR operation on the data and the generated random number (step 520).

Sender program 260 concatenates the string m and the release time d. Sender program 260 determines a string $c_m$ by encrypting the concatenated string using the public key of time server $140_1$ and an encryption algorithm, such as the encryption method described in R. Cramer and V. Shoup, "A Practical Cryptosystem Provably Secure Under Chosen Ciphertext Attack," in the proceedings of Advances in Cryptology—CRYPTO 98, Lecture Notes in Computer Science, Springer Verlag, which is incorporated herein by reference in its entirety (step 530). Sender program 260 then sends to receiver $130_1$ the string $c_m$, the encrypted data, and the desired release time d (step 540).

Figure 6:
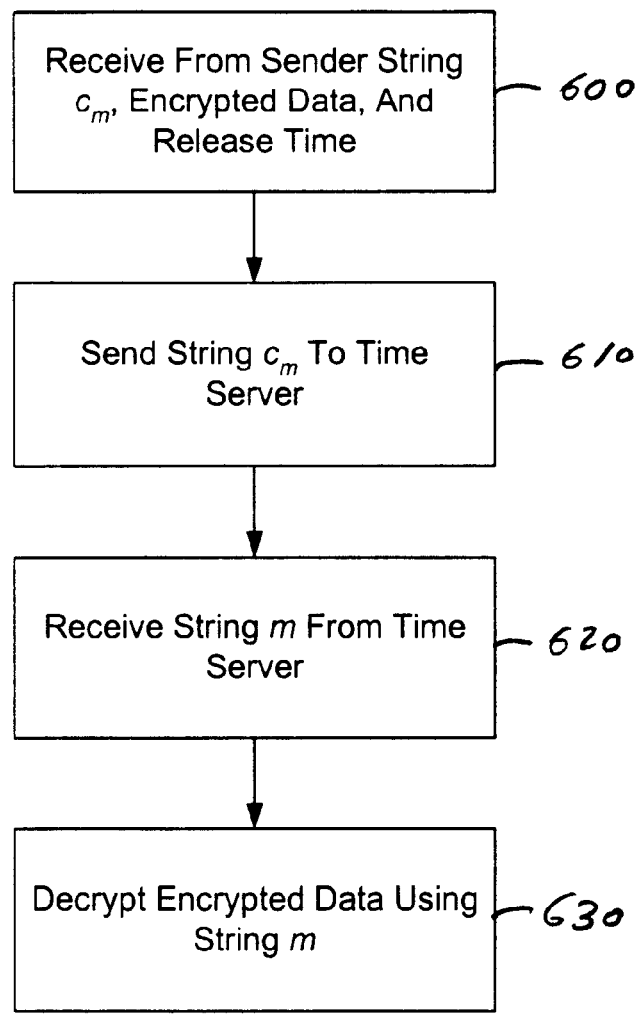
FIG. 6 is a flow chart of the steps performed by a receiver for decrypting timed-release data received from a sender, in accordance with an embodiment of the invention, where information about the sender and the data are not revealed to a time server.

FIG. 6 is a flow chart of the steps performed by receiver program 360 in receiver $130_1$ for decrypting the encrypted data received from sender $110_1$, in accordance with an embodiment of the invention where information about sender $110_1$ and the data are not revealed to time server $140_1$. Receiver program 360 receives from sender $110_1$ the string $c_m$, the encrypted data, and the release time d (step 600). Receiver program 360 requests from time server $140_1$ to decrypt the string $c_m$ according to the release time d, which is encrypted as part of the string $c_m$ by sender 110, (step 610).

If time server $140_1$ determines that the current time t is less than the release time d, receiver program 620 receives from time server $140_1$ a rejection message, which may include, for example, a null string. However, if time server $140_1$ determines that the current time t is greater than or equal to the release time d, receiver program 620 receives from time server $140_1$ the string m (step 620).

Receiver program 360 then decrypts the encrypted data based on the string m (step 630). For example, receiver program 360 may input the string m into a pseudo random number generator to generate a random number. Receiver program 360 then decrypts the encrypted data by performing an exclusive OR operation on the encrypted data and the generated random number.

Figure 7:
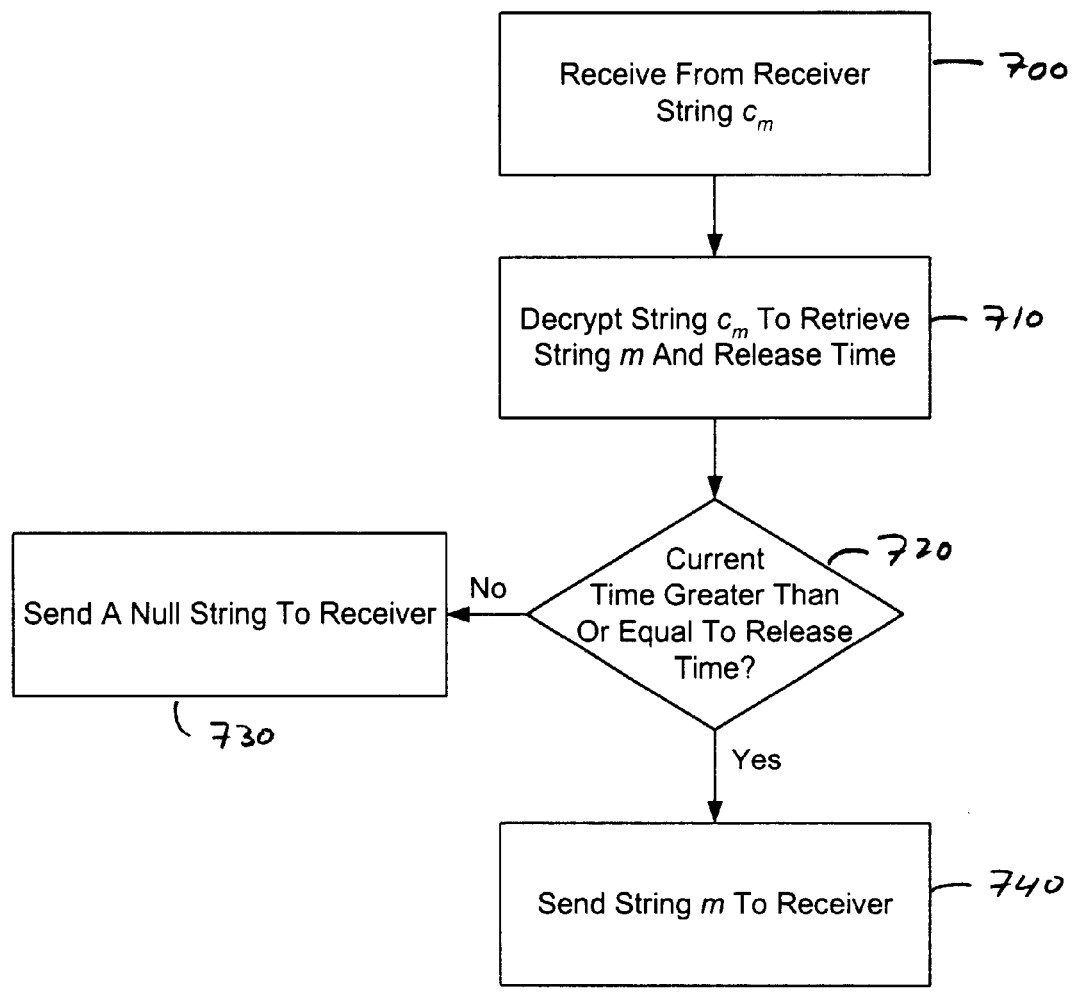
FIG. 7 is a flow chart of the steps performed by a time server for determining the release time of timed-released data generated by a sender, in accordance with an embodiment of the invention, where information about the data and the sender are not revealed to the time server.

FIG. 7 is a flow chart of the steps performed by server program 460 in time server $140_1$ for decrypting the string $c_m$, in accordance with an embodiment of the invention where information about the data and sender $110_1$ are not revealed to time server $140_1$. Server program 460 receives from receiver $130_1$ the string $c_m$, requesting time server $140_1$ to decrypt the string $c_m$ according to the release time d encrypted in string $c_m$ (step 700). Server program 460 decrypts the string $c_m$ to determine the string m and the release time d (step 710).

Server program 460 then determines whether the current time t is greater than or equal to the determined release time d (step 720). If the current time t is less than the determined release time d, server program 460 sends receiver $130_1$ a rejection message, which may include, for example, a null string (step 730). However, if the current time t is greater than or equal to the determined release time d, server program 460 sends to receiver $130_1$ the string m, which receiver $130_1$ uses to decrypt the encrypted data as described above (step 740).

In another embodiment, sender $110_1$ desires to send timed-release data to receiver $130_1$ such that receiver $130_1$ decrypts the timed-release data only when the current time t is greater than or equal to the release time d desired by sender $110_1$. However, in this embodiment, receiver $130_1$ decrypts the timed-release data without revealing to server $140_1$ any information about the data, sender $110_1$, and the release time d. Furthermore, release time d and current time t each include k bits, i.e., bits $d_1$ through $d_k$ and $t_1$ through $t_k$, respectively, where k is a sufficiently large integer.

Figure 8:
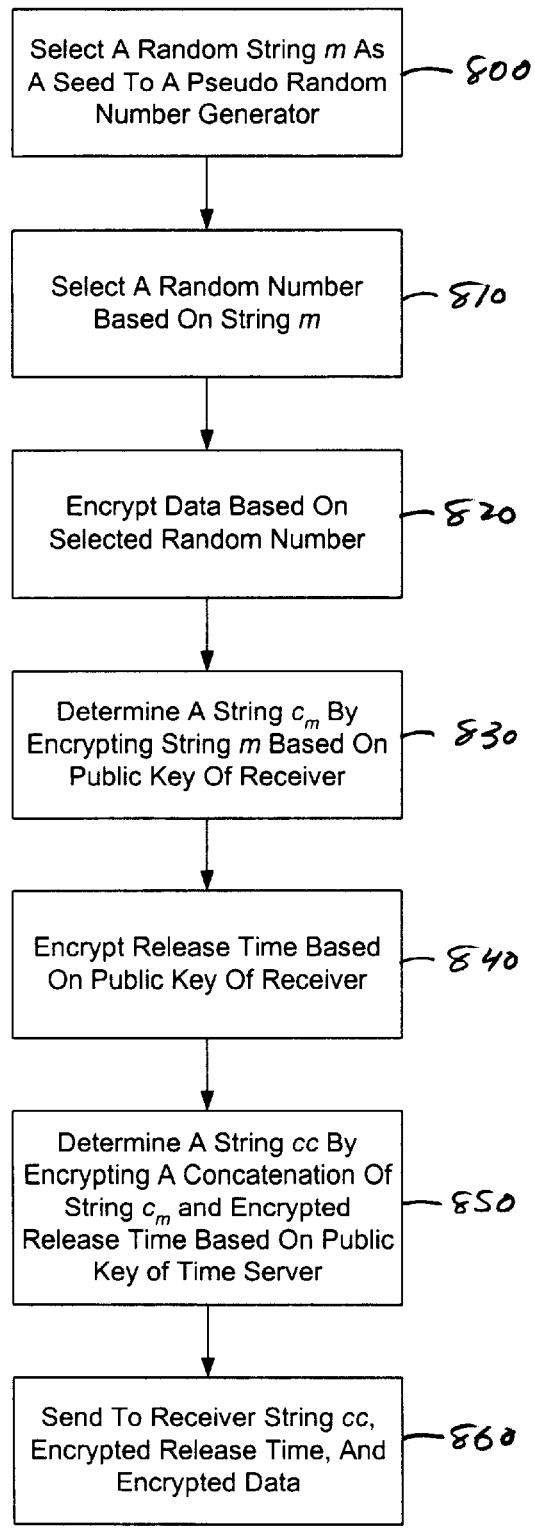
FIG. 8 is a flow chart of the steps performed by a sender for sending timed-release data to a receiver, in accordance with an embodiment of the invention, where information about the sender, the data, and the release time of the data are not revealed to a time server.

FIG. 8 is a flow chart of the steps performed by sender program 260 for sending timed-release data to receiver $130_1$, in accordance with the embodiment of an invention where information about sender $110_1$, the data, and the release time d are not revealed to time server $140_1$. Sender program 260 determines a key by randomly selecting a string m, which may include a plurality of bits (step 800). Sender program 260 uses the string m as a seed to the pseudo random number generator to generate a random number (step 810).

Sender program 260 encrypts the data based on the generated random number by, for example, performing an exclusive OR operation on the data and the generated random number (step 820). Sender program 260 determines a string $c_m$ by encrypting the string m using the public key x of receiver $130_1$ and an encryption algorithm, such as the encryption method described in R. Cramer and V. Shoup, "A Practical Cryptosystem Provably Secure Under Chosen Ciphertext Attack," in the proceedings of Advances in Cryptology—CRYPTO 98, Lecture Notes in Computer Science, Springer Verlag (step 830).

Sender program 260 encrypts the desired release time d using the public key x (step 840). For example, sender program 260 may encrypt release time d as a k-tuple integers each of which is either a random quadratic residue modulo the public key x or a random quadratic non-residue modulo the public key x. The encrypted release time $c_d$ may be determined as follows:

$$c_d = (D_1, D_2, \ldots D_k) \text{ with } D_i = r_i^2 (-1)^{d_i} \text{ modulo } x,$$

where $r_i$ is randomly selected from a set of integers smaller than the public key x and relatively prime with x; $D_i$ is a quadratic non-residue modulo the public key x, if $d_i$ is 1; and $D_i$ is a quadratic residue modulo the public key x, if $d_i$ is 0.

Sender program 260 then concatenates the string $c_m$ and the encrypted release time $c_d$. Sender program 260 then determines a string cc by encrypting the concatenated string using the public key of time server $140_1$ and an encryption algorithm, such as the encryption method described in R. Cramer and V. Shoup, "A Practical Cryptosystem Provably Secure Under Chosen Ciphertext Attack," in the proceedings of Advances in Cryptology—CRYPTO 98, Lecture Notes in Computer Science, Springer Verlag (step 850). Sender program 260 sends to receiver $130_1$ the string cc, the encrypted release time $c_d$, the release time d, and the encrypted data (step 860).

Figure 9:
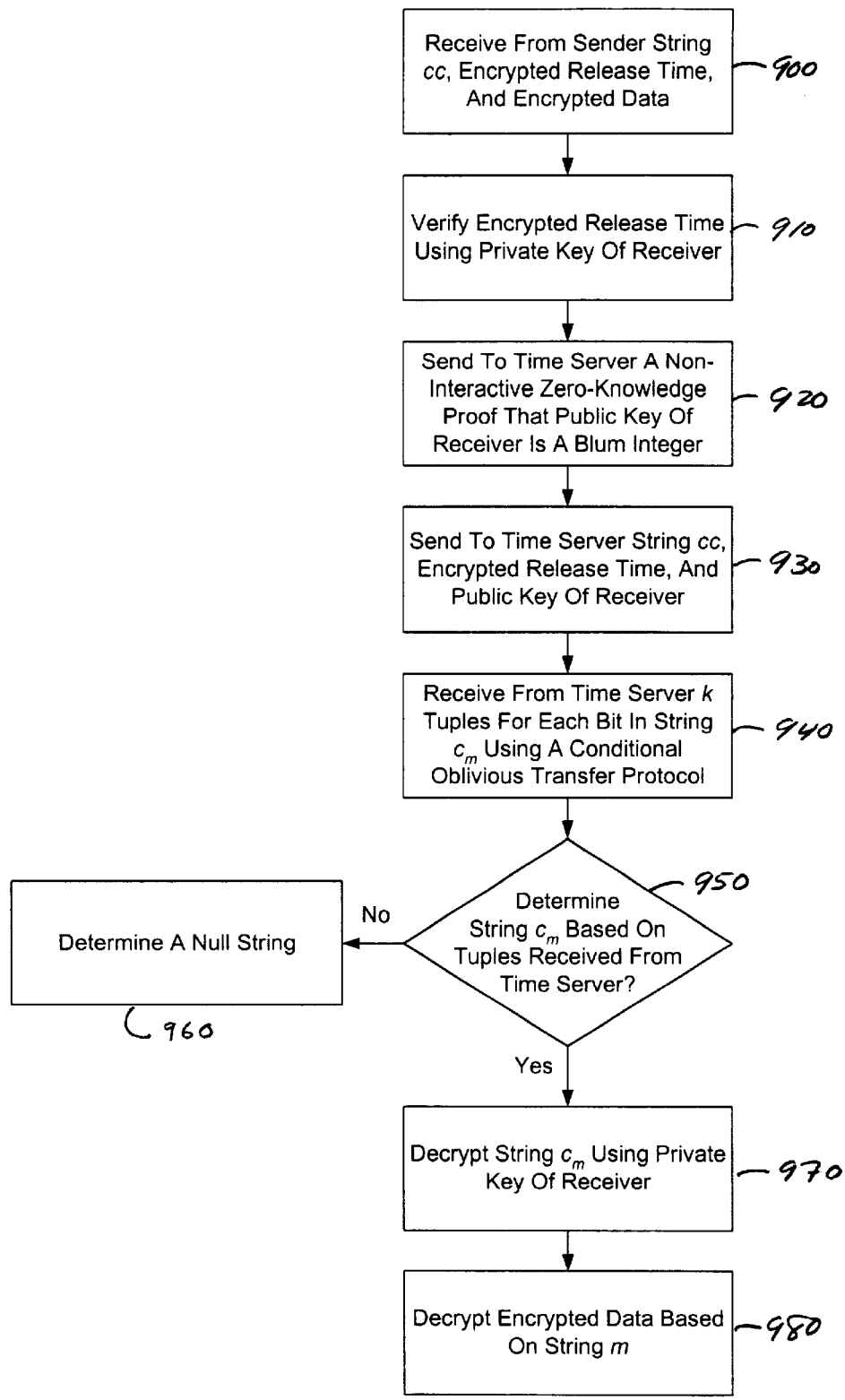
FIG. 9 is a flow chart of the steps performed by a receiver for decrypting timed-release data based on information exchanged with a time server, in accordance with an embodiment of the invention, where information about the sender that generated the data, the data, and the release time of the data are not revealed to the time server.

FIG. 9 is a flow chart of the steps performed by receiver program 360 for decrypting the timed-release data received from sender $110_1$, in accordance with an embodiment of the invention where information about sender $110_1$, the data, and the release time d are not revealed to time server $140_1$. Receiver program 360 receives from sender $110_1$ the string cc, the encrypted release time $c_d$, the release time d, and the encrypted data (step 900). Receiver program 360 verifies the release time d by decrypting the encrypted release time $c_d$ using the private key of receiver $130_1$ and comparing the decrypted release time with the release time d received from sender $110_1$ (step 910). Receiver program 360 then sends to time server $140_1$ a zero-knowledge proof message, notifying time server $140_1$ that the public key x includes a Blum integer (step 920).

Receiver program 360 then sends to time server $140_1$ the string cc, the encrypted release time $c_d$, and the public key x (step 930). In response, receiver program 360 receives from time server $140_1$ k tuples for each bit in the string cm using a conditional oblivious transfer protocol, which will be described below in detail (step 940).

As described below, receiver program 360 determines whether the string $c_m$ can be determined from the tuples received from time server $140_1$ (step 950). When the current time t is less than the release time d, receiver program 360 determines a rejection, for example, a null string (step 960). When the current time is greater than or equal to release time d, receiver program 360 determines the string $c_m$ based on the tuples and decrypts the string $c_m$ using the private key x to retrieve the string m (step 970).

Receiver program 360 then decrypts the encrypted data based on the decrypted string m (step 980). For example, receiver program 360 may input string m into a pseudo random number generator to generate a random number. Receiver program 360 then decrypts the encrypted data by performing an exclusive OR operation on the encrypted data and the generated random number.

Figure 10:
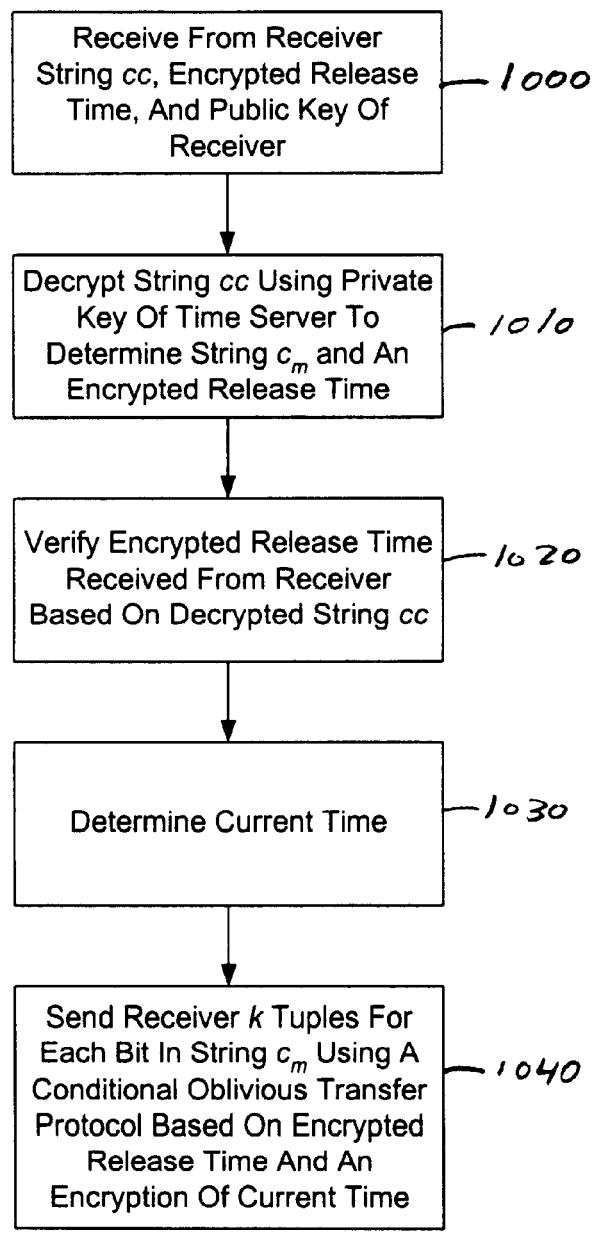
FIG. 10 is a flow chart of the steps performed by a time server when receiving from a receiver information associated with a timed-release data, in accordance with an embodiment of the invention, where information about the data, the release time of the data, and the sender that generated the data are not revealed to the time server.

FIG. 10 is a flow chart of the steps performed by server program 460 when receiving from receiver $130_1$ the string cc, the encrypted release time $c_d$, and the public key x, in accordance with an embodiment of the invention where information about the data, the release time d, and sender $110_1$ are not revealed to the time server $140_1$.

Server program 460 receives from receiver $130_1$ the string cc, the encrypted release time $c_d$, and the public key x (step 1000). Server program 460 decrypts the string cc using the private key of server $140_1$ to determine the string cm and an encrypted release time $c_d$ (step 1010). Server program 460 verifies the encrypted release time $c_d$ received from receiver $130_1$ by comparing it with the encrypted release time $c_d$ determined from the decrypted string cc (step 1020).

Server program 460 determines the current time t (step 1030). Using a conditional oblivious transfer protocol, server program 460 then determines as a function of the encrypted release time $c_d$ and an encryption of the current time t a condition, which when satisfied enables receiver $130_1$ to determine the string $c_m$ from the condition (step 1040). As shown below in detail, server program 460 may represent the condition in the form of k tuples for each bit in the string $c_m$, which server program 460 sends to receiver $130_1$.

Figure 11:
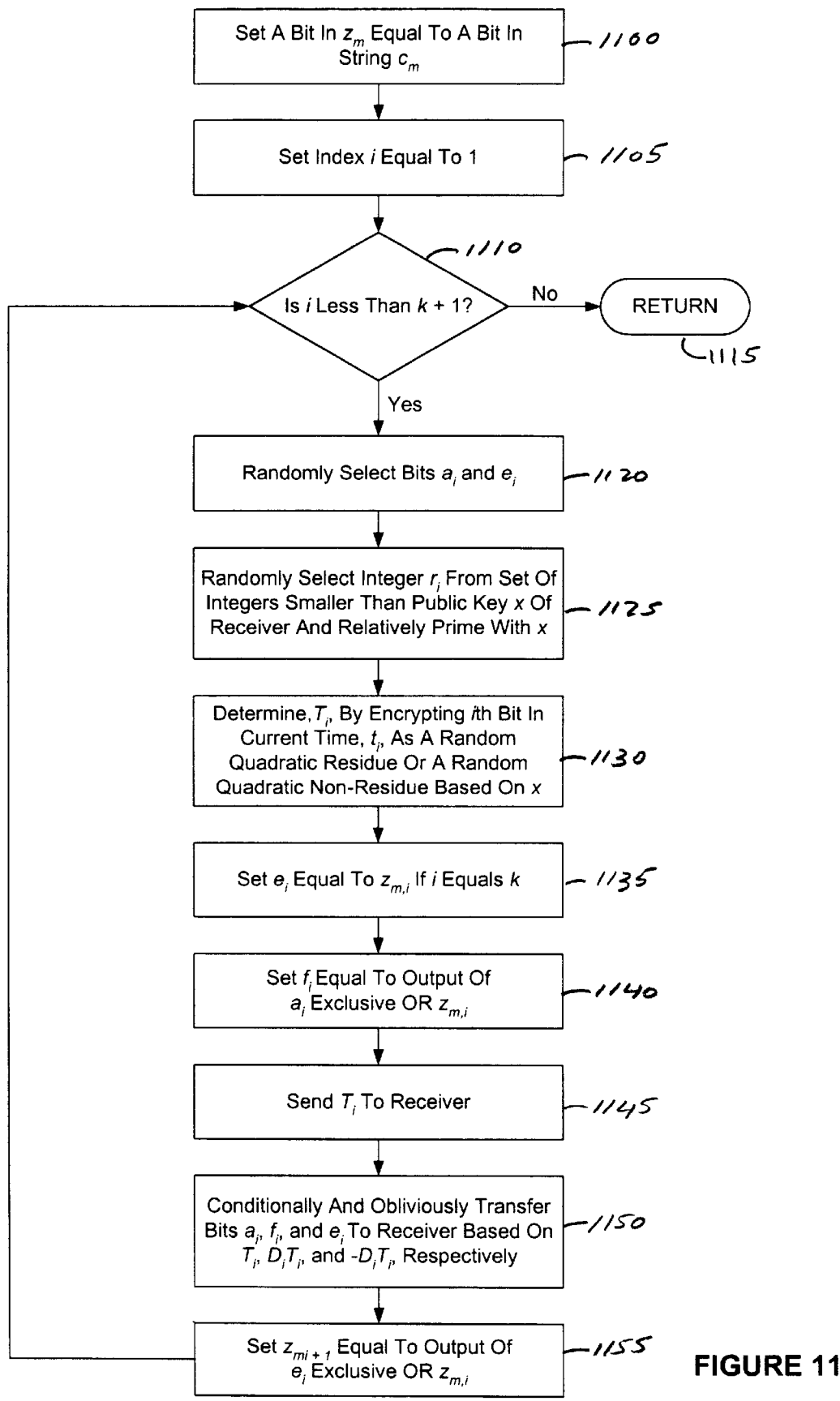
FIG. 11 is a flow chart of the steps performed by a time server for determining a condition, which when satisfied enables a receiver to decrypt timed-release data, in accordance with an embodiment of the invention.

FIG. 11 is a flow chart of the steps performed by server program 460 for using a conditional oblivious transfer method to determine a condition, which when satisfied enables receiver 110₁ to determine the string $c_m$ from the condition, in accordance with an embodiment of the invention shown as step 1040 in FIG. 10. To encrypt the condition, server program 460 performs the steps 1100 through 1155 shown in FIG. 11 k times for each bit $c_{m,j}$ in the string $c_m$, where the index j takes on values in the range of $1 \leq j \leq k$. Alternatively, server program 460 may perform the steps 1100 through 1155 in a multi-threaded fashion, i.e. concurrently for all bits $c_{m,j}$ in the string $c_m$.

Starting with the first bit, $c_{m,1}$ in the string cm, server program 460 initializes a string of k bits $z_m$, where k is a security parameter, such as the number of bits in release time d, and sets $z_{m,1}$ equal to the first bit $c_{m,1}$ in the string $c_m$ (step 1100). Server program 460 then initializes an index i to 1 (step 1105) and determines whether the index i is greater than k (step 1110). If the index i is greater than k, server program 460 determines that k tuples for the bit $c_{m,1}$ has been generated and continues to the next bit $c_{m,2}$ in the string $c_m$ (step 1115).

If the index i is not greater than k, server program 460 performs the steps 1120 through 1155 as follows: Server program 460 randomly selects two bits $a_i$ and $e_i$ (step 1120). Server program 460 randomly selects an integer $r_i$ from a set of integers smaller than the public key x of receiver 130₁ and relatively prime with x (step: 1125). Server program 460 encrypts the ith bit $t_i$ in the current time t as a random quadratic residue or a random quadratic non-residue based on the public key x (step 1130). For example, the ith bit $t_i$ may be encrypted and represented as follows:

$$T_i = r_i^2 (-1)^{t_i} \text{ modulo } x,$$

where $T_i$ is a quadratic non-residue modulo the public key x, if $t_i$ is 1, and $T_i$ is a quadratic residue modulo the public key x, if $t_i$ is 0.

Server program 460 then sets the bit $e_i$ equal to $z_{m,i}$ if the index i equals k (step 1135). Server program 460 then performs an exclusive OR operation on the bit $a_i$ and $z_{m,i}$ and sets a bit $f_i$ equal to the output of the operation (step 1140). Server program 460 then sends computed $T_i$ to receiver 130₁ (step 1145).

As will be described below in detail, server program 460 then conditionally and obliviously sends bits $a_i$, $f_i$, and $e_i$ to receiver 130₁ based on $T_i$, $D_i T_i$, and $-T_i D_i$, respectively, all of which collectively form a portion of a condition called a tuple (step 1150). Server program 460 then performs an exclusive OR operation on the bits $e_i$ and $z_{m,i}$ and sets the bit $z^{m,i+1}$ equal to the output of the operation (step 1155).

After incrementing the index i by 1, server program 460 then determines whether the incremented index i is less than k+1 (step 1110), and if so, repeats steps 1110 through 1155. Server program 460 repeats these steps until index i is greater than k, at which point server program 460 has generated k tuples associated with the ith bit $c_{m,i}$.

Figure 12:
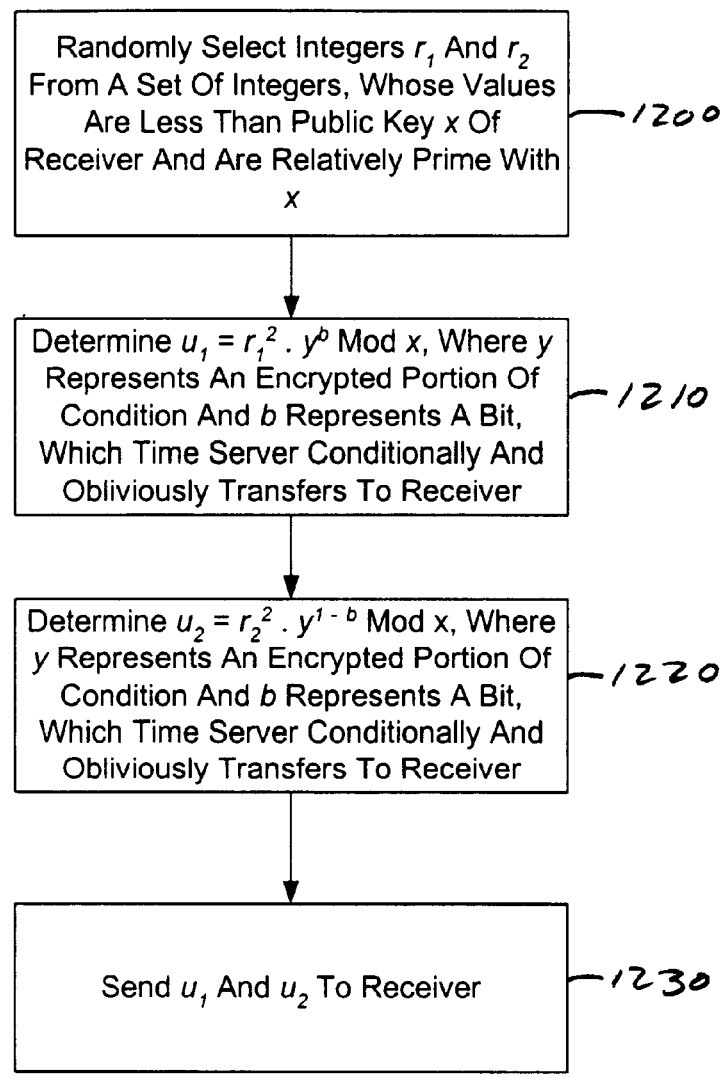
FIG. 12 is a flow chart of the steps performed by a time server for conditionally and obliviously sending to a receiver a portion of a condition for decrypting timed-release data, in accordance with an embodiment of the invention.

FIG. 12 is a flow chart of the steps performed by server program 460 for conditionally and obliviously sending to receiver 130₁ a portion of a condition (i.e., the bits $a_i$, $f_i$, and $e_i$ based on $T_i$, $D_i T_i$, and $-T_i D_i$, respectively), in accordance with an embodiment of the invention shown as step 1150 in FIG. 11. For each of the bits $a_i$, $f_i$, and $e_i$, server program 460 performs the steps 1200 through 1230 shown in FIG. 12.

Starting with the bit $a_i$; server program 460 randomly selects integers $r_1$ and $r_2$ from a set of integers, whose values are less than the public key x and are relatively prime with the public key x (step 1200). Server program 460 then determines integers $u_1$ (step 1210) and $u_2$ (step 1220) as follows:

$$u_1 = r_1^2 \cdot y^b \text{ modulo } x, \text{ and}$$

$$u_1 = r_2^2 \cdot y^{1-b} \text{ modulo } x,$$

where y takes on the value of $T_i$ and b takes on the value of the bit $a_i$.

Server program 460 sends integers $u_1$ and $U_2$ to receiver 130₁ (step 1230). Server program 460 then repeats the steps 1200 through 1230 for $f_i$ and $e_i$, where b takes on values $f_i$ and $e_i$ and y takes on values $T_i D_i$ and $-T_i D_i$, respectively.

Figure 13:
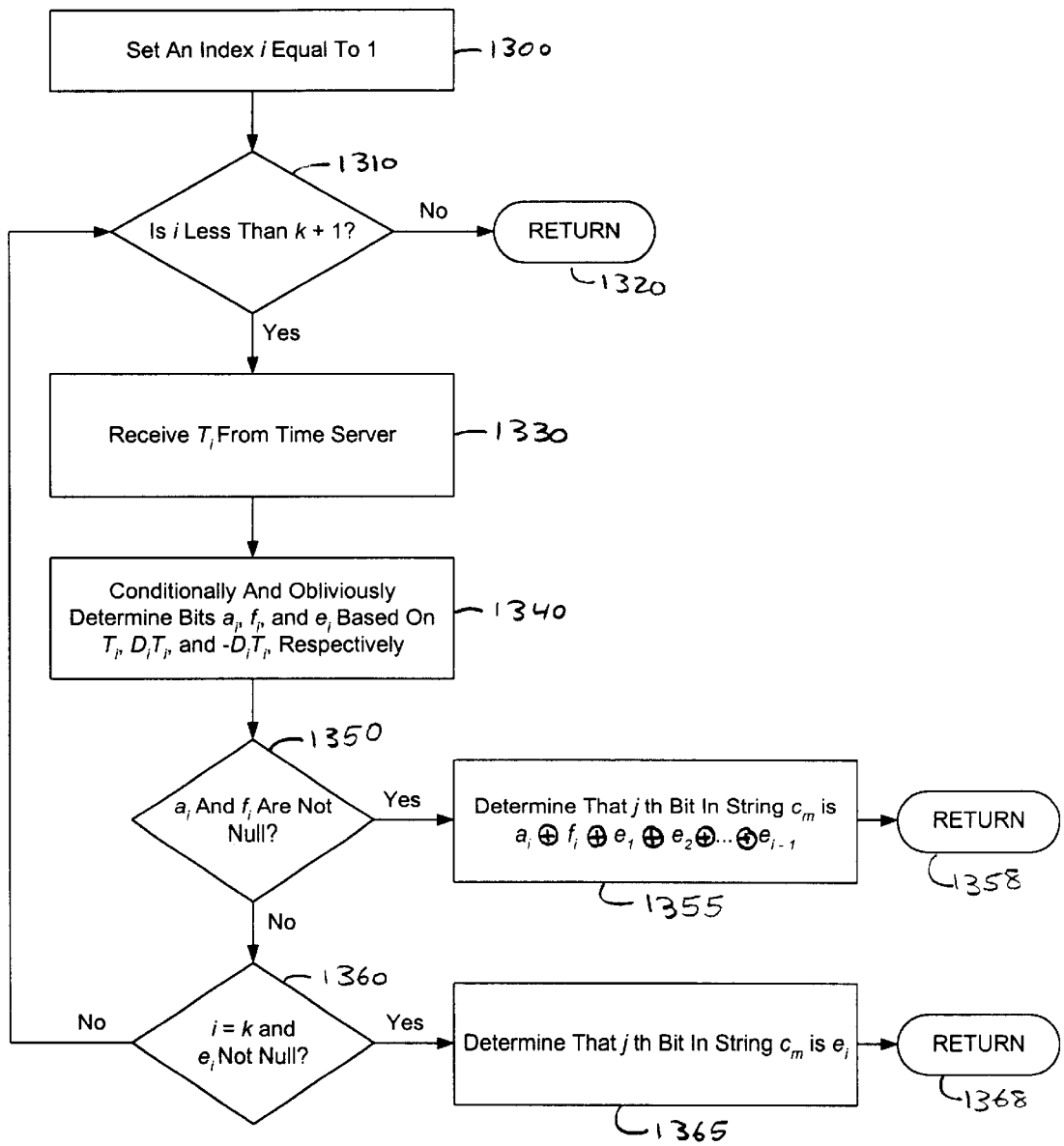
FIG. 13 is a flow chart of the steps performed by a receiver for decrypting timed-release data, in accordance with an embodiment of the invention.

FIG. 13 is a flow chart of the steps performed by receiver program 360 for using a conditional oblivious transfer method to determine the string $c_m$, in accordance with an embodiment of the invention. Receiver program 360 initializes an index i to 1 (step 1300). Receiver program 360 determines whether the index i is greater than k (step 1310). When index i is greater than k, receiver program 360 determines that it has received from time server 140₁ k tuples associated with the jth bit $c_{m,j}$.

Otherwise, receiver program 360 performs the following steps: Receiver program 360 receives from time server 140₁ the ith bit $T_i$ in the encrypted current time t (step 1330). Receiver program 360 conditionally and obliviously determines the bits $a_i$, $f_i$, and $e_i$ based on $T_i$, $T_i D_i$, and $-T_i D_i$, respectively (step 1340).

Receiver program 360 then determines whether the determined bits $a_i$ and $f_i$ are not null (step 1350). If the bits $a_i$ and $f_i$ are not null, receiver program 360 determines the jth bit $c_{m,j}$ by performing an exclusive OR operation on the bits $a_i$, $f_i$, $e_1$, $e_2$, . . . , and $e_{i-1}$ (step 1355).

If at least one of the bits $a_i$ and $f_i$ is null, receiver program 360 determines whether the index i equals k and whether the determined bit $e_i$ is not null (step 1360). If the index i equals k and the bit $e_i$ is not null, then receiver program 360 determines that the jth bit $c_{m,j}$ equals the bit $e_i$ (step 1365).

Otherwise, receiver program 360 increments the index i and repeats steps 1310 through 1360 until the incremented index i is greater than k, at which point receiver program 360 has received k tuples from time server 140₁. If none of the steps 1350 and 1360 described above yields an affirmative output, receiver program 360 fails to determine the string $c_m$, and thus, cannot decrypt the encrypted data received from sender 1101. However, if at least one of the steps 1350 and 1360 yields an affirmative output, receiver program 360 repeats the steps 1300 through 1360 to determine the next bit in the string $c_m$.

When receiver program 360 determines the string $c_m$, receiver program 360 decrypts the string $c_m$ using the private key of receiver 130, to recover the string m. Receiver program 360 then inputs the recovered string m into a pseudo random number generator to generate a random number. Receiver program 360 then decrypts the encrypted data by performing an exclusive OR operation on the encrypted data and the generated random number. Accordingly, receiver program 360 decrypts the encrypted data only when the current time is greater than or equal to the release time d, without revealing to time server 140₁ any information about sender 110₁, the data, the release time d, and about whether receiver 130₁ has successfully decrypted the encrypted data.

Figure 14:
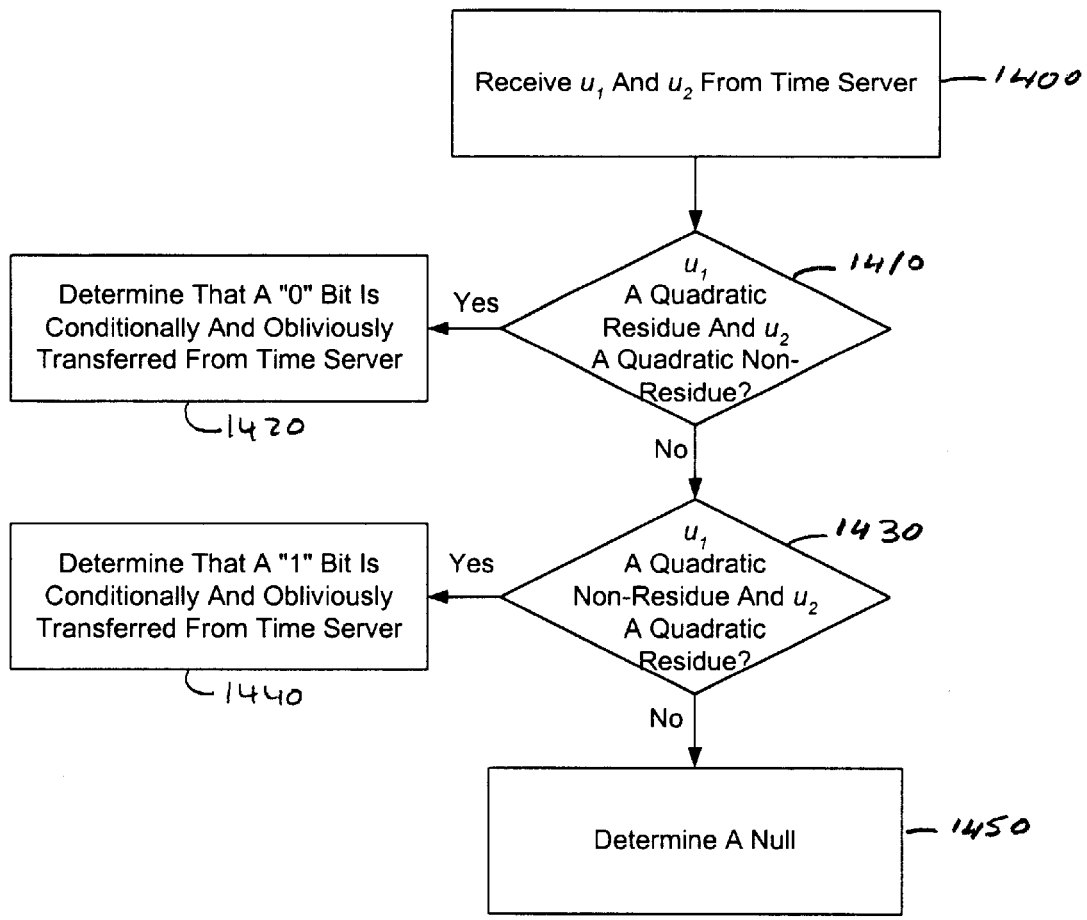
FIG. 14 is a flow chart of the steps performed by a receiver for conditionally and obliviously determining a portion of a condition for decrypting timed-release data, in accordance with an embodiment of the invention.

FIG. 14 is a flow chart of the steps performed by a receiver program for conditionally and obliviously determining a portion of a condition received from time server 140₁ for decrypting a timed-release data, in accordance with an embodiment of the invention shown as step 1340 in FIG. 13. Receiver program 360 receives integers $u_1$ and $u_2$ from time server 140, (step 1400). Receiver program 360 determines whether $u_1$ is a quadratic residue modulo the public key x and $u_2$ is a quadratic non-residue modulo of the public key x (step 1410). If receiver program 360 determines that $u_1$ is a quadratic residue and $u_2$ is a quadratic non-residue, receiver program 360 determines that a "0" bit is received from time server 140$_1$ (step 1420).

Otherwise, receiver program 360 determines whether $u_1$ is a quadratic non-residue modulo x and $u_2$ is a quadratic residue modulo x (step 1430). If receiver program 360 determines that $u_1$ is a quadratic non-residue modulo x and $u_2$ is a quadratic residue modulo x, receiver program 360 determines that a "1" bit is received from time server 140$_1$ (step 1440). Otherwise, receiver program 360 determines that a null is received from time server 140$_1$ (step 1450).

In another embodiment, to authenticate the encrypted data, sender 110$_1$ may also attach a signature tag to the encrypted data using any known authentication or signature method.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for timed-release cryptography, comprising the steps of:
   creating a string of data by concatonating a sender key and a predetermined time representing a time data will be made available at a receiver;
   encrypting said string using a public key of a server;
   encrypting data using the sender key;
   sending said encrypted data and said encrypted string to a receiver; and
   exchanging information between the receiver and the server such that the receiver decrypts the encrypted data when a current time determined by the server is greater than or equal to the predetermined time, without any communication between the sender and the server.

2. The method of claim 1, wherein the step of encrypting the data comprises the steps of:
   selecting a pseudo random number by using said key as a seed to a pseudo random number generator; and
   performing a bitwise exclusive OR operation on the data and the selected pseudo random number.

3. The method of claim 1, wherein the exchanging step comprises the step of:
   decrypting by the receiver the encrypted data without revealing to the server any information about the sender and the data.

4. The method of claim 1, wherein the exchanging step comprises the steps of:
   sending from the receiver the encrypted key and the encrypted predetermined time to the server;
   decrypting by the server the encrypted key and the encrypted predetermined time;
   sending by the server a rejection to the receiver when the current time is less than the decrypted predetemined time;
   sending by the server the decrypted key to the receiver when the current time is greater than or equal to the decrypted predetermined time; and
   decrypting by the receiver the encrypted data based on the decrypted key received from the server.

5. The method of claim 4, wherein the step of decrypting the encrypted data comprises the steps of:
   determining a pseudo random number based on the decrypted key received from the server; and
   performing a bitwise exclusive OR operation on the data and the determined pseudo random number.

6. A method for timed-release cryptography, comprising the steps of:
   encrypting by a sender a key using a public key of a receiver;
   encrypting a predetermined time using on a public key of a receiver;
   encrypting data using the sender key;
   encrypting a concatenation of the encrypted key and the encrypted predetermined time based on a public key of a server; and
   exchanging information between the receiver and the server such that the receiver decrypts the encrypted data when a current time determined by the server is greater than or equal to the predetermined time, without any communication between the sender and the server.

7. The method of claim 6, wherein the exchanging step comprises the step of:
   decrypting by the receiver the encrypted data without revealing to the server any information about the sender and the data.

8. The method of claim 6, wherein the exchanging step comprises the step of:
   decrypting by the receiver the encrypted data without revealing to the server any information about the sender, the data, and the predetermined time.

9. The method of claim 6, wherein the exchanging step comprises the steps of:
   sending from the receiver the encrypted concatenation to the server;
   determining by the receiver the encrypted key using a conditional oblivious transfer method;
   decrypting the determined encrypted key based on the public key of the receiver; and
   decrypting the encrypted data based on the decrypted key.

10. The method of claim 9, wherein the conditional oblivious transfer method comprises the steps of:
    determining a condition that is a function of whether the current time is greater than or equal to the predetermined time;
    encrypting by the server the current time;
    encrypting the encrypted key based on the determined condition, the encrypted current time, and the public key of the receiver;
    sending the encrypted key to the receiver;
    decrypting by the receiver the encrypted key when the condition is satisfied; and
    determining by the receiver a rejection when the condition fails.

11. The method of claim 10, wherein the step of encrypting the encrypted key comprises the steps of:
    determining a plurality of tuples for each bit in the encrypted key, wherein the plurality of tuples are a function of the encrypted current time and the encrypted predetermined time.

12. The method of claim 10, wherein the step of decrypting the encrypted key comprises the steps of:

receiving from the server a plurality of tuples for each bit in the encrypted key, wherein the plurality of tuples are a function of the encrypted predetermined time and the encrypted current time; and decrypting the encrypted key based on the plurality of tuples to determine the encrypted key.

13. The method of claim 10, wherein the step of determining the rejection comprises the step of:

determining by the receiver the rejection without revealing to the server any information about the rejection.

14. A cryptography method, comprising the steps of:

encrypting by a sender a sender key and a portion of a condition based on a public key of a receiver;

encrypting by the sender data using the sender key;

determining by a server the condition based on the encrypted portion of the condition and the sender key;

determining by the receiver the encrypted key based on the determined condition when the determined condition is satisfied, without any communication between the sender and the server; and decrypting the encrypted data based on the determined encrypted key.

15. The method of claim 14, wherein the step of determining the encrypted sender key comprises the step of:

determining the encrypted sender key without revealing to the server any information about the sender and the data.

16. The method of claim 14, wherein the step of determining the encrypted sender key comprises the step of:

determining the encrypted sender key without revealing to the server any information about the sender, the data, and the portion of the condition.

17. The method of claim 14, wherein the step of determining the encrypted sender key comprises the step of:

determining the encrypted sender key without revealing to the server any information about the sender, the data, and whether the condition is satisfied.

18. The method of claim 14, wherein the step of determining the encrypted sender key comprises the step of:

determining the encrypted sender key without revealing to the server any information about the sender, the data, the portion of the condition, and whether the condition is satisfied.

19. A system, comprising:

a first processor for encrypting a key and a release time, and for encrypting data based on the encrypted key;

a server for determining a current time, and for determining a condition as a function of the encrypted release time and the determined current time; and a second processor for determining the encrypted key based on the determined condition when the current time as determined by the server is greater than or equal to the release time, without revealing to the server any information about the first processor, the data, and the release time, and for decrypting the encrypted data based on the encrypted key.

* * * * *

UNITED STATES PATENT AND TRADEMARK OFFICE
CERTIFICATE OF CORRECTION

PATENT NO.    : 6,813,358 B1
DATED         : November 2, 2004
INVENTOR(S)   : Giovanni Di Crescenzo et al.

It is certified that error appears in the above-identified patent and that said Letters Patent is hereby corrected as shown below:

<u>Column 11,</u>
Line 35, change "concatonating" to -- concatenating --.

Signed and Sealed this

Twenty-second Day of November, 2005

JON W. DUDAS
*Director of the United States Patent and Trademark Office*